United States Patent [19]
Felice

[11] 4,156,138
[45] May 22, 1979

[54] LOCATING UNDERGROUND URANIUM DEPOSITS

[75] Inventor: Patrick E. Felice, Jeannette, Pa.

[73] Assignee: Westinghouse Electric Corp., Pittsburgh, Pa.

[21] Appl. No.: 824,203

[22] Filed: Aug. 12, 1977

Related U.S. Application Data

[62] Division of Ser. No. 701,432, Jun. 30, 1976, Pat. No. 4,053,772.

[51] Int. Cl.² ............................................. G01V 5/00
[52] U.S. Cl. ................................... 250/253; 250/337; 250/484
[58] Field of Search ............... 250/253, 254, 255, 337, 250/484

[56] References Cited

U.S. PATENT DOCUMENTS 2,775,710  12/1956  Ludeman ............................. 250/253
3,665,194  5/1972   Alter et al. ........................... 250/253
4,053,772  11/1977  Felice ............................... 250/253 X Primary Examiner—Davis L. Willis
Attorney, Agent, or Firm—M. P. Lynch

[57] ABSTRACT

Underground uranium deposits are located by placing wires of dosimeters each about 5 to 18 mg/cm² thick underground in a grid pattern. Each dosimeter contains a phosphor which is capable of storing the energy of alpha particles. In each pair one dosimeter is shielded from alpha particles with more than 18 mg/cm² thick opaque material but not gamma and beta rays and the other dosimeter is shielded with less than 1 mg/cm² thick opaque material to exclude dust. After a period underground the dosimeters are heated which releases the stored energy as light. The amount of light produced from the heavily shielded dosimeter is subtracted from the amount of light produced from the thinly shielded dosimeter to give an indication of the location and quantity of uranium underground.

1 Claim, 2 Drawing Figures

LOCATING UNDERGROUND URANIUM DEPOSITS

This is a division of application Ser. No. 701,432 filed June 30, 1976 now U.S. Pat. No. 4,053,772.

BACKGROUND OF THE INVENTION

When underground uranium undergoes radioactive decay one product eventually formed is the radioactive gas radon. The radon migrates to the surface where the alpha and beta rays it emits can be uniquely detected by dosimeters.

Commonly used dosimeters contain a material such as cellulose nitrate which the alpha particles damage when they traverse it, leaving tracks. The tracks are etched in a reagent such as sodium hydroxide to enlarge them. They are then counted under a microscope to give an indication of the size and location of the uranium deposits. (See U.S. Pat. No. 3,665,194.) these dosimeters are expensive to read and can only be used once. Also the tracks tend to anneal out at about 120° F., limiting their use in hot climates.

PRIOR ART

U.S. Pat. No. 2,559,219 describes a dosimeter consisting of a finely-divided phosphor in a resinous matrix.

U.S. Pat. No. 3,300,643 describes the construction and operation of a thermoluminescent radiation dosimeter using a lithium fluoride phosphor.

SUMMARY OF THE INVENTION

I have found that alpha-sensitive dosimeters alone will store the energy of alpha particles, but are insensitive to the gamma and beta ray background radiation, if their thickness is within the critical range of 5 to about 18 mg/cm$^2$.

I have also found that the determination of uranium concentration is made more sensitive if a second alpha-particle-shielded dosimeter is paired with the alpha-unshielded dosimeter to measure gamma and beta ray background radiation. The difference gives a more sensitive reading of the alpha particle radiation that is present.

The dosimeters of this invention are less expensive than prior track-etch dosimeters and they can be reused indefinitely. The readout process is less expensive, because they can be easily read using automatic equipment. They can be used at temperatures at least as high as 200° F.

DESCRIPTION OF THE INVENTION

Figure 1:
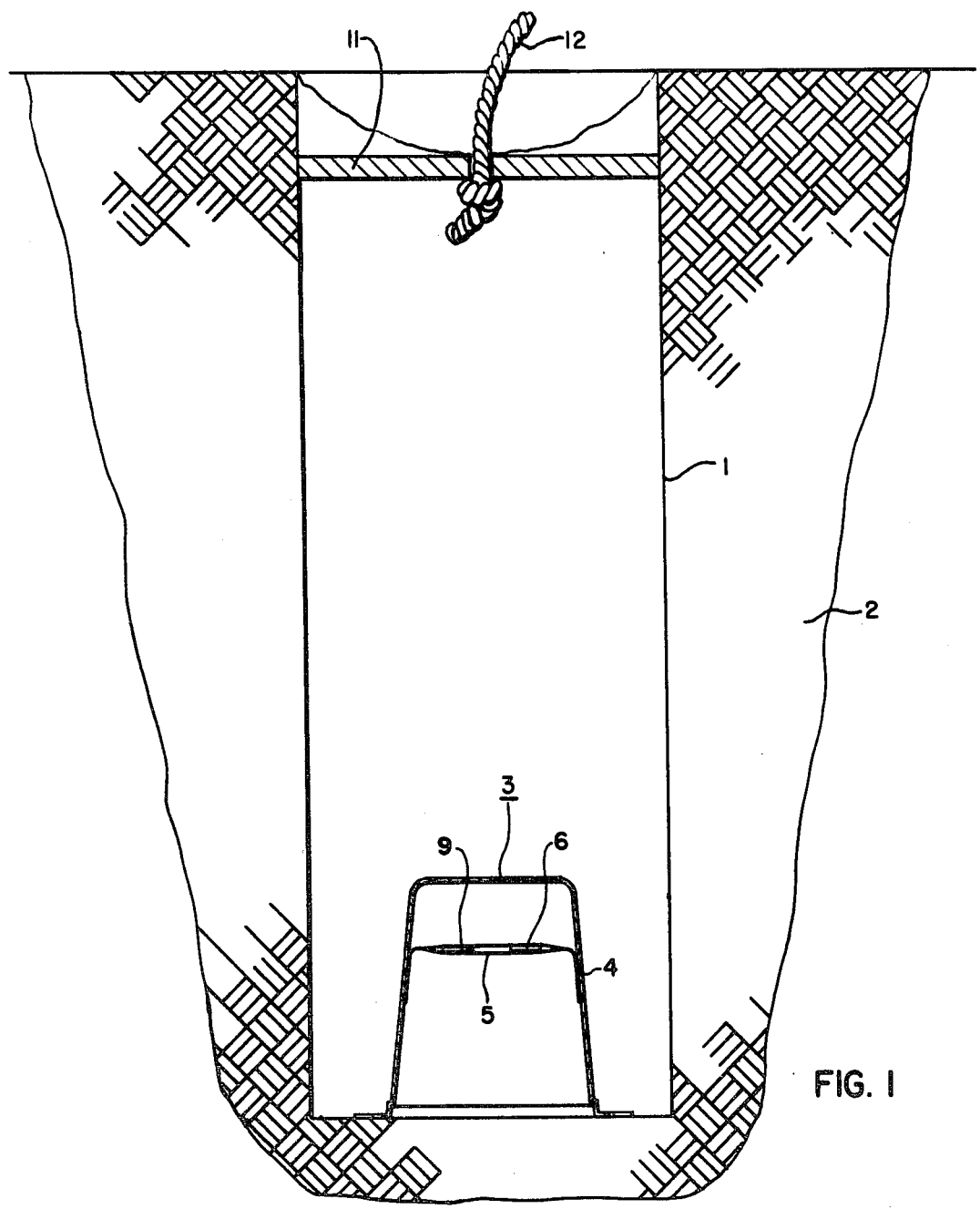
FIG. 1 is a side view in section of a certain presently preferred embodiment of a pair of dosimeters according to the invention positioned in an underground testing facility.
Figure 2:
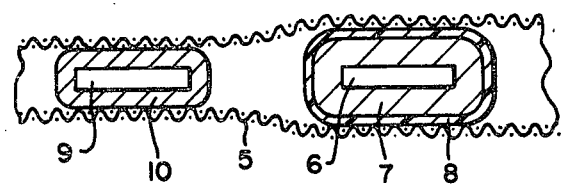
FIG. 2 is an enlarged sectional view of a portion of FIG. 1.

In the drawings a hole 1 excavated in ground 2 houses dosimeter housing 3 which consists of an inverted cup 4 to which metallic screen 5 has been stapled or otherwise affixed. To the screen are affixed two alpha-particle sensitive dosimeters each about 5 to about 18 mg/cm$^2$ thick, one 6 shielded with more than 18 mg/cm$^2$ aluminum or other material to exclude alpha-particles but not beta gamma ray background radiation, and sealed in 2 mil polyethylene 8 and the other 9 contained in 0.030 mil aluminum 10 which permits the passage of alpha, beta and gamma particles but excludes dust particles. A cover 11, secured to rope 12, protectsthe dosimeters.

The phosphor in the dosimeters must be capable of storing energy from alpha particles and then later releasing this energy in some detectable form. Usually, the energy is released as light when the phosphor is heated to about 280° to 300° C. Preferably, the phosphor should have a fade rate of less than 6% over a 6-month period to allow time for the accumulation of the energy from the alpha particles, and for the retrieval and reading of the dosimeters. A typical phosphor is made of calcium sulfate doped with about 1% by weight dysoprosium. It has approximately the same sensitivity as manganese-doped calcium sulfate, but its fading rate is lower. A dosimeter of calcium sulfate in polytetrafluoroethylene is about 1 to 3 mils thick and preferably about 2 mils thick. The phosphor may be used by itself as a polycrystalline or single crystal material but it is preferably held in a matrix material because the matrix phosphor is readily available and the phosphor itself is difficult to form in very thin layers. The matrix material should be inert in that it should not adversely affect the functioning of the phosphor. It should therefore be transparent to light, which is later released. If the stored energy is later released by heat, of course, the matrix material should be able to withstand the heat without damage so that the dosimeter can be re-used. It should also be inert to the conditions found in the field (e.g., moisture). Various organic resins can be used but polytetrafluoroethylene is preferred because it is inert and can withstand a 300° C. readout temperature.

A dosimeter can be made by mixing the phosphor and matrix material using about 2 to about 30% by weight phosphor. Preferably, about 5 to 15% by weight phosphor is used. If too much phosphor is present, the matrix material will lack strength and if too little is present, the dosimeter will lack sensitivity. The mixture is solidified and cut or otherwise formed to the necessary thickness.

Whether the phosphor is used alone as a polycrystalline or single crystal material or in a matrix, the thickness of the phosphor is critical to the success of this invention. If the thickness is greater than about 18 mg/cm$^2$, the dosimeter will lack alpha sensitivity because it will also significantly register beta and gamma ray background radiation. On the other hand, if it is thinner than about 5 mg/cm$^2$, it will lose the signal from alpha particles. About 10 mg/cm$^2$ seems to be an ideal thickness. Since the sensitivity of the dosimeter increases with its area, and a large area reduces the time the dosimeter must be in the field, the area of the dosimeter should be as large as feasible, preferably greater than about 6 mm in diameter.

In order to measure and eliminate background radiation two dosimeters should be used together, one lightly shielded and the other heavily shielded from alpha particles but not gamma and beta rays. The count from the heavily shielded dosimeter is then substracted from the count from the lightly shielded dosimeter. A suitable heavy shield is aluminum about 3 mils thick. To prevent radon from penetrating the shield, the heavily shielded dosimeter should be placed inside a sealed polyethylene bag or in some other gas-excluding material. For a light shield, 0.03 mil aluminum can be used.

Though other arrangements for supporting the dosimeters may be used besides that shown in the drawing, the arrangement in the drawing has the advantage of protecting the dosimeters within the cup from mechanical abuse yet exposing them directly to radon from the ground. In the drawing the screen containing the dosimeters should be suspended about one inch away from the bottom of the cup so that radon volume in the cup is utilized equally on both sides of the dosimeter.

The dosimeter should be positioned at least 1 foot below the surface of the ground to help decrease background surface radiation. About 24 to 30 inches below the surface is preferred. The dosimeters are generally placed in a grid pattern, preferably about 100 to about 200 feet apart and left for about 2 to 4 weeks before being collected and read.

The following example further illustrates this invention:

EXAMPLE I

Dosimeters consisting of about 11% by weight dysprosium-doped calcium sulfate in a polytetrafluoroethylene matrix were prepared by Teledyne, Inc. by mixing, pressing with heat to form a rod, and slicing thin layers from the rod. The dosimeters were 0.6 cm. in diameter, 0.005 cm. thick, and weighed 1.75 mg.

The dosimeters (referred to as "TLF" for "thermoluminescent foils") were irradiated with a thin $235_U$ surface alpha emitter about 1 inch in diameter. This source emits about 4.14 to 4.4 MeV alpha particles per cm² sec toward the dosimeter in contact. The range of the alpha particles was about 3.49 mg/cm².

The doses received in the dosimeters in Rad, D, can each be calculated from the formula:

$$D = \frac{\phi A t E}{100 W} \left( \frac{10^6}{6.24 \times 10^{11}} \right) = 1.60 \times 10^{-8} \frac{\phi A t E}{W} \text{ (in Rad)}$$

where $\phi$ = $\alpha$ flux per cm² per sec = 4.14/cm² sec
A = area of the TLF = $(0.6)^2/4$ = 0.283 cm²
t = time of exposure = $2.52 \times 10^4$ sec
E = energy of the $\alpha$ particles in MeV or 4.4 MeV
W = weight of the TLF in gm = $1.75 \times 10^{-3}$ gm
$10^6/6.24 \times 10^{11}$ = a constant converting MeV into ergs
100 = a constant converting ergs per gm into Rads The dose calculated was 1.24 Rad. When the exposed dosimeters were measured in the reader, an average value of 342 "digits" was obtained on top of a background reading of 13 digits. From the above, we can conclude that for the 1.75 mg dosimeter, 1 Rad of $\alpha$ exposure corresponds to about 276 digits, or one digit corresponds to 0.00362 Rad (3.62 mRad) or about 86 $\alpha$ particles. Since the background was about 13 digits, it corresponds to about 47 mRad or $1.12 \times 10^3$ $\alpha$ particles in the 1.75 mg dosimeter. The exposed dosimeters were read in an atmosphere of flowing nitrogen (4 standard cubic feet per hour) in a thermoluminescent reader.

These TLF's were then used to measure $\alpha$ particles emitted from gases emanating from underground. Three dosimeters were suspended inside a 250 ml plastic beaker. The beaker was buried 2 feet underground with the mouth of the beaker facing downward. Foil (a) was bare. Foil (b) was wrapped in a very thin aluminum foil ($2.7 \times 10^{-5}$ cm or 0.19 mg/cm²) which allows $\alpha$ particles to pass through with ease. Foil (c) was wrapped in a 0.01 cm or 27 mg/cm² thick aluminum foil to stop all $\alpha$ particles but allow $\beta$ and $\gamma$ rays to go through. After two separate exposures of 14 and 24.8 days, the foils were read in the TLF readers. The results are given below:

14-Day Exposures

Background reading of foils (a) and (c) before exposure = 14 digits. Foil (a) reading after exposure = 25 − 14 = 11 digits. Foil (c) reading after exposure = 16 − 14 = 2 digits, or 7.24 mRad or 0.52 mRad/day due to $\beta$ and $\gamma$ background. The net reading in foil (a) due to $\alpha$ particles was 11 − 2 = 9 digits, or $9 \times 86/14$ or 55 4.4 MeV-equivalent $\alpha$ particles hitting the foil per day. Since the foil was hit by the $\alpha$ particles from both sides, and the area of the foil was 0.283 cm², the 4.4 MeV-equivalent flux was $(55/2) \times 0.283$ or 97 $\alpha$'s per cm² per day.

24.8-Day Exposures

Background reading of foils (a) and (b) before exposure = 12 digits. Foil (a) reading after exposure = 30 − 12 = 18 digits. Foil (b) reading after exposure = 34 − 12 = 22 digits. The average reading of foils (a) and (b) was 20 digits. Foil (c) reading before exposure = 14 digits. Foil (c) reading after exposure = 16 − 14 = 2 digits or 7.24 mRad or 0.29 mRad/day due to $\beta$ and $\gamma$ background. The net average reading in foils (a) and (b) due to $\alpha$ particles was 20 − 2 = 18 digits or $18 \times 86/24.8$, or 62 4.4 MeV-equivalent $\alpha$ particles hitting the foils per day. The corresponding $\alpha$ flux was $(62/2) \times 0.283$ or 110 per cm² per day.

The above data indicates that the dosimeter can measure an average of, say, 100 4.4 MeV-equivalent particles/cm² day in the presence of $\beta$ and $\gamma$ background of, say, 0.5 mRad.

In the Track-Etch method of measuring $\alpha$ particles, J. E. Gingrich, "Uranium Exploration Made Easy," Power Engineering, August, 1973, p. 48 mentioned that the track density for the background exposure was about 110 to 330 $\alpha$ tracks per cm² per day. It is clear that the TLF method can measure these fluxes or any larger values without difficulty. Therefore, these dosimeters present a simpler method of measuring $\alpha$ particles in air such as that from radon and radon daughters. Since the presence of a radon anamoly can serve as an indication of the presence of uranium, these dosimeters offer a simple and low-cost method to be used in uranium exploration.

EXAMPLE II

Dosimeters as described in Example I and the drawing were buried for 19 days 8" below the ground level over a known uranium deposit about 150 feet directly below. (The ideal depth was not used due to difficult soil conditions and improper equipment.) Two kinds of dosimeters were used. FD-$\partial$ measure $\alpha$-particles and FD-$\beta$ measures only the background $\beta$-particles and $\gamma$-rays. Both detectors were suspended inside a 250-ml polypropylene beaker. Ten beakers or cups were buried 8 inches underground 40 to 80 feet apart. The detectors were recovered after 19 days of exposure. At that time, it was found that four cups (Nos. 2, 8, 9 and 10) had remained intact but that six had been disturbed. Of those disturbed, three (Nos. 1, 4 and 6) had the plywood covers over the hole displaced. Cups 3 and 5 had been pulled entirely out of their burial holes. Cup 7 was missing. The disturbance may have been caused by foraging cattle or by workmen unaware of the experiment. The cups located more directly over the uranium deposit (e.g., cups 6, 9, and 10) gave readings 1½ to 3 times higher than the $\alpha$-background in the surrounding neighborhood (e.g., cups 2, 5, and 8). Resolution of the method was unusually good. For example, the GT values (i.e., grade thickness, the % uranium times the thickness of the deposit) of uranium at locations 8 and 9, separated by a distance of 80', are <0.25 and 3.0 respectively. The α-readings are 9 AU (arbitrary radiation unit) and 29 AU respectively.

I claim:

1. An apparatus for detecting underground deposits of uranium as a function of the alpha particles present in radon gas, comprising, a non-porous cup member having an open end and a closed end, a flat alpha-sensitive dosimeter of a thickness to store the energy of alpha particles while being substantially insensitive to gamma and beta radiation, said flat alpha-sensitive dosimeter being secured within said non-porous cup member at a location intermediate the open and closed ends of said non-porous cup member such that both surfaces of said flat, alpha-sensitive dosimeter are exposed to the alpha particles of radon gas entering said non-porous cup member.

* * * * *